United States Patent
Wassenhoven et al.

(10) Patent No.: US 6,340,855 B1
(45) Date of Patent: Jan. 22, 2002

(54) BEARING A SPINNING ROTOR OF AN OPEN-END SPINNING APPARATUS

(75) Inventors: Heinz-Georg Wassenhoven, Mönchengladbach; Bert Schlömer, Heinsberg, both of (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 09/512,561

(22) Filed: Feb. 24, 2000

(30) Foreign Application Priority Data

Mar. 9, 1999 (DE) .......................... 199 10 279

(51) Int. Cl.$^7$ .............................. H02K 7/09; D01H 4/00
(52) U.S. Cl. ............................ 310/90.5; 57/606
(58) Field of Search .................. 310/90, 90.5; 57/400, 57/406

(56) References Cited

U.S. PATENT DOCUMENTS

| | | | |
|---|---|---|---|
| 4,106,192 A | 8/1978 | Stahlecker | 308/172 |
| 4,371,218 A | 2/1983 | Ichikawa | 308/10 |
| 5,622,040 A | 4/1997 | Preutenborbeck et al. | 57/406 |
| 5,987,871 A | 11/1999 | Winzen | 57/406 |
| 6,006,510 A | * 12/1999 | Coenen | 57/406 |
| 6,105,355 A | * 8/2000 | Winzen et al. | 57/406 |
| 6,124,658 A | * 9/2000 | Coenen | 310/90.5 |

FOREIGN PATENT DOCUMENTS

AT    270 459    4/1969

OTHER PUBLICATIONS

German Search Report Jul. 1999.
Patent Abstract—DE 2514734—See reference AA above Aug. 1978.
Patent Abstract—DE 3047606—See reference BB above Feb. 1983.
Patent Abstract—DE 19542079—See reference CC above Apr. 1997.
Patent Abstract DE 19729191—See reference DD above Nov. 1999.

* cited by examiner

*Primary Examiner*—Nestor Ramirez
*Assistant Examiner*—Dang Dinh Le
(74) *Attorney, Agent, or Firm*—Kennedy Covington Lobdell & Hickman, LLP

(57) ABSTRACT

A bearing of a spinning rotor 3 of an open-end spinning apparatus, in which the rotor shaft is radially supported by means of support disks and is axially positioned by a magnetic bearing. The center axis 51 of the rotor 3 is offset relative to the center axis 50 of the static bearing component 27 of the axial bearing 18 in the direction of the bearing nip 56. In addition, at least in the region of the end of the axial bearing 18 toward the support disks 54, 54', an engagement surface 40 with an anti-friction surface layer is provided, which supports the rotor 3, especially during rotor cleaning.

25 Claims, 5 Drawing Sheets

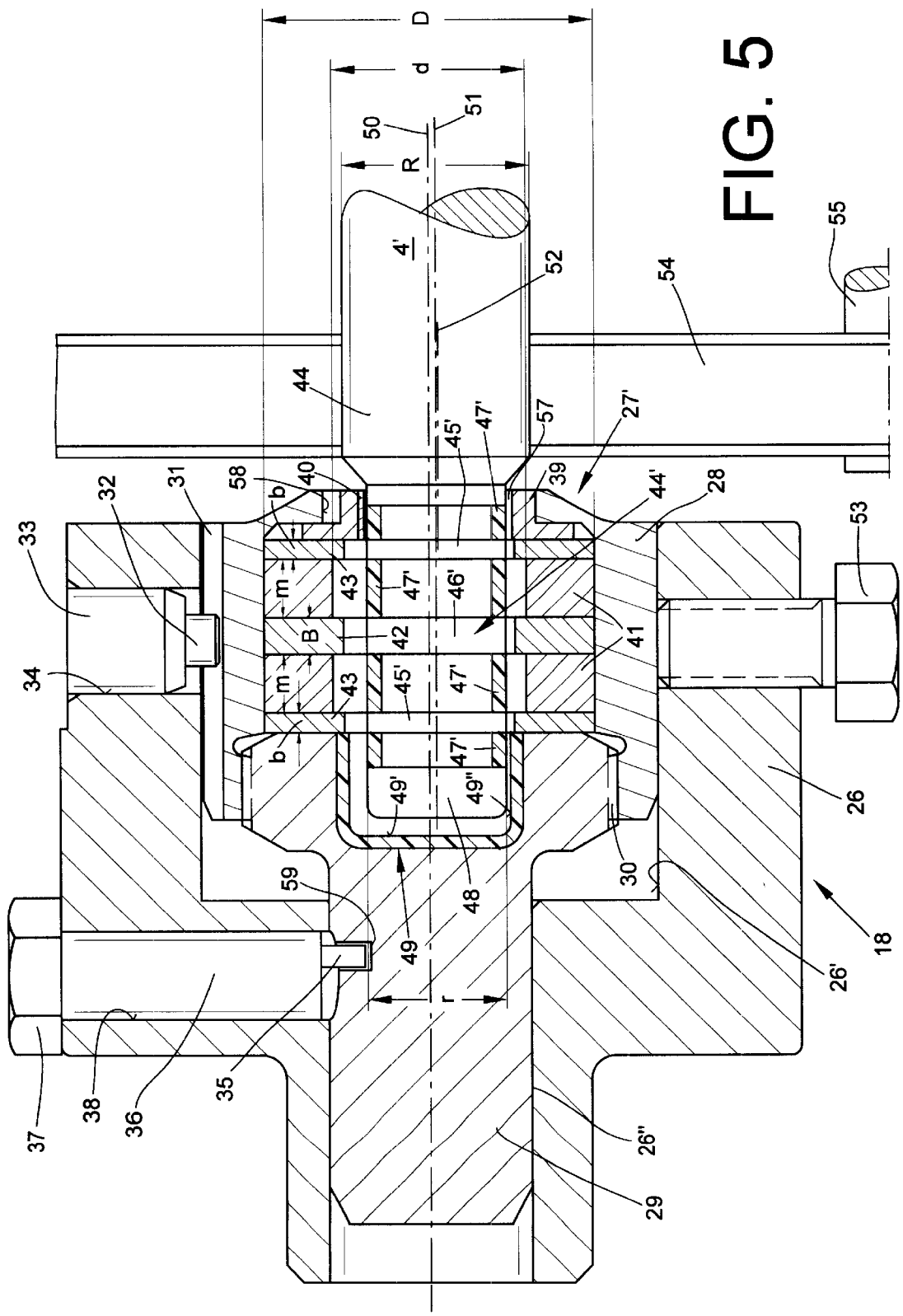

BEARING A SPINNING ROTOR OF AN OPEN-END SPINNING APPARATUS

CROSS-REFERENCES TO RELATED APPLICATIONS

This application claims the benefit of German patent application DE19910279.1, filed Mar. 9, 1999, herein incorporated by reference.

1. Field of the Invention

The present invention relates to a bearing of a spinning rotor of an open-end spinning apparatus.

2. Background of the Invention

In open-end rotor spinning machines, spinning assemblies are known in which the spinning rotor revolving at high rpm is braced with its rotor shaft in the bearing gap of a support disk bearing arrangement and is fixed via an axial bearing disposed on the end. The support disk bearing arrangement includes two pairs of support disks whose axes are transposed such that an axial thrust is exerted on the rotor shaft that urges the rotor shaft in contact with the mechanical axial bearing.

This type of bearing for open-end spinning rotors is described for instance in published, nonexamined German Patent Application DE-OS 25 14 734, and has been proven itself in practice to allow rotor speeds of 100,000 rpm or more. However, a disadvantage of this type of spinning rotor bearing is that, because of the transposition of the support disks, increased friction occurs between the rotating peripheral surfaces of the support disks and the rotor shaft, which leads to heating of the peripheral surfaces of the support disks. This frictional heat not only causes considerable stress on the peripheral surfaces of the support disks, but also requires additional energy to overcome this friction. Furthermore, the known mechanical axial bearings are subject to not inconsiderable wear, even if they are lubricated as prescribed.

Attempts have therefore already been made in the past to replace these mechanical axial bearings with wear-free axial bearings, such as air bearings or magnetic bearings. However, since even air bearings require an axial thrust of the rotor shaft in the direction of the axial bearing, it has not been possible to overcome most of the above-described fundamental problems with air bearings.

In German Patent Disclosure DE 195 42 079 A1, an axial magnetic bearing assembly is described in which some of the magnetic bearing elements are disposed in stationary fashion in the housing of an axial bearing, while other magnetic bearing elements are disposed detachably on the rotor shaft of the spinning rotor. Various different ways of binding the magnetic bearing elements, which rotate with the spinning rotor, to the rotor shaft have been proposed. Some of these variants pertain to a nonpositive, and others to a positive fastening of the jointly rotating magnetic bearing elements, which can easily be detached as needed.

Although these known magnetic bearing arrangements provide correct axial fixation of the rotor shaft on the support disk arrangement and moreover assure that as needed the spinning rotor can easily be installed and removed, it has nevertheless been found that the positive fastening of the magnetic bearing component to the rotor shaft, which is easily detachable as needed and is advantageous in principle, still needs improvement. In particular, the fastening of the jointly rotating magnetic bearing elements to the rotor shaft is problematic in such magnetic bearing arrangements, because stringent demands are made on the quality of the balance of this connection due to the high rpm of the spinning rotor.

An open-end rotor spinning apparatus with a permanent-magnetic axial bearing is also known from Austrian Patent AT 270 459. In this bearing arrangement, several magnetic ring inserts are disposed on the end of the rotor shaft of a spinning rotor, and opposite thereto are pole pieces of a permanent magnet that is pivotably supported in this region. Such an arrangement achieves a focusing of the magnetic lines of force of the permanent magnet which leads to a relatively rigid fixation of the rotor shaft in the bearing nip of a support disk bearing.

A disadvantage of a magnetic bearing arrangement embodied in this manner, however, is that the ring inserts disposed on the rotor shaft have a markedly greater diameter than the rotor shaft itself. Since the markedly larger-diameter ring inserts make it considerably more difficult or impossible to install and remove the spinning rotor, and especially to mount it on the front, this known magnetic bearing arrangement has not become established in practice.

German Patent Disclosure DE 30 47 606 A1 discloses a bearing for a spindle of a textile machine which revolves at relatively high rpm. This spindle is braced in the radial direction via a three-point bearing arrangement similar to a support disk bearing and is secured in the axial direction by a magnetic bearing. On its end, the spindle has a reduced-diameter bearing region with two ferromagnetic ring inserts. A cuff made of a nonmagnetic material is fixed to the bearing housing, and an annular permanent-magnetic element is fitted into this cuff and is enclosed by lateral pull disks. In the installed state of the spindle, the ferromagnetic ring inserts of the spindle shaft face the pole disks of the permanent-magnetic element that is fixed in the static bearing element.

Although these known embodiments enable relatively easy installation and removal of the spindles in the axial direction, the apparatus has not become established in practice because of its lack of axial bearing rigidity.

A bearing of a spinning rotor of an open-end spinning apparatus is also known from German Patent Disclosure DE 197 29 191 A1, in which the rotor is radially supported in the bearing nip of a support disk bearing and is axially positioned by a magnetic axial bearing. The axial bearing has a static bearing component with at least two permanent-magnetic rings defined on both sides by pole disks. These permanent-magnetic rings are disposed in a bearing body such that in the installed state, identical poles face one another (N/N or S/S). The rotor shaft has at least three ferromagnetic ribs disposed at a distance from the pole disks.

German Patent Disclosure DE 197 29 191 A1 also indicates that the bearing housing is lowered with its center axis relative to the center axis of the rotor shaft defined by the position of the bearing nip of the support disks. As a result, an upward-oriented radial force component is imparted to the rotor shaft in the region of the axial bearing. Thus, when cleaning of the rotor, the rotor is no longer pressed into the bearing nip by the contact pressure roller, which presses the lengthwise-extending tangential belt that drives the rotor shaft, but instead is retained in a horizontal position. However, this radial component has an adverse effect during the drive of the rotor.

SUMMARY OF THE INVENTION

It is therefore an object of the present invention to provide an improved bearing of the basic type described above for use in a spinning rotor.

This object is attained according to the invention by a bearing for a shaft of a spinning rotor of an open-end spinning apparatus which basically comprises a support disk bearing defining a bearing nip for radially supporting the rotor shaft and a magnetic axial bearing for axially positioning the rotor shaft. The axial bearing has a static bearing component with at least two axially polarized permanent-magnetic rings bounded on opposite sides by pole disks, the permanent-magnetic rings being disposed in a bearing body such that corresponding magnetic poles face one another. The rotor shaft has at least three ferromagnetic annuli at respective spacings from the pole disks. The support disk bearing is disposed in relation to the static bearing component of the axial bearing to retain the rotor shaft in the bearing nip with a center axis of the rotor at an offset in the direction of the bearing nip from a center axis of the static bearing component. The static bearing component includes an engagement surface outwardly of the magnetic rings and the pole disks toward the support disk bearing and on the side of the support disk bearing remote from the bearing nip. The engagement surface faces the rotor shaft over an angular extent of at least about 45° of the rotor shaft and has a wear-protected surface layer for reducing the coefficient of friction of the engagement surface, with the wear-protected surface layer being spaced from the rotor shaft during operation by no more than half the smallest spacing between the pole disks and the ferromagnetic annuli.

The offset according to the invention in the support disk bearing of the rotor relative to the static bearing component of the axial bearing assures improved guidance of the rotor in the bearing nip of the support disks. Above all, the concentricity of the rotor is enhanced, and the influence of transit-time-associated changes from flexing work in the support disk lining decreases, because the adhesion of the rotor shaft to the support disk lining inside the bearing nip is improved. As a result, the invention thus makes it possible to further increase the possible rotor rpm and thus to improve productivity.

The radial force component on the rotor shaft, attained by the bearing offset, leads to an increased tendency of the rotor shaft to tilt out of the bearing nip of the support disks while the rotor is being cleaned. To prevent the ferromagnetic annuli of the rotor shaft from then coming into contact with the pole disks disposed between the magnets, an engagement surface with a wear-protected surface layer that reduces the coefficient of friction is provided on the side of the bearing remote from the bearing nip (this and subsequent directional indications with reference to the bearing nip being understood to mean radially relative to the rotor shaft and hence the rotor axis) and at a suitably slight spacing from the rotor shaft. At least when the rotor is cleaned, the rotor shaft comes into contact with this surface layer and is then supported on it, yet the aforementioned contact between the annuli and pole disks does not occur.

The reduction in the coefficient of friction by the surface layer, upon rotation of the rotor during cleaning, does not lead to a perceptible or even harmful heating of the rotor shaft. Such heating could, particularly if the spaces (typically grooves) between the annuli of the rotor shaft are filled with a material that is not temperature resistant, could cause it to melt and could cause the entire bearing region to stick together. The embodiment as a wear-protected surface assures that the layer wears down only very slowly if at all, so that the position of the engagement surface does not perceptibly change, and the properties of reducing the coefficient of friction are preserved.

The disposition of the engagement surface, or of the wear-protected surface layer that reduces the coefficient of friction, on a ring insert makes it easy to replace the ring insert. It is accordingly also possible to make this entire ring insert of this material.

The radial adjustability of the ring insert allows adjusting the annular gap as needed. A narrower annular gap on the side remote from the bearing nip is advantageous, because canting of the rotor shaft during cleaning of the rotor cup is as a result even more restricted.

Because the rotor is pressed during cleaning into the axial bearing by a drive mechanism of the cleaning unit (e.g. a traveling service unit) acting on the rotor cup, it is advantageous to provide a support surface axially in the region of the end of the rotor shaft as well. On the one hand, this arrangement limits the axial motion of the rotor and, on the other hand, because this support surface also has a wear-protected surface layer that reduces the coefficient of friction, it minimizes thermal stress on the rotor shaft in the region of the axial bearing.

Because the rotor is tilted during cleaning, the rotor can also be supported not only on the aforementioned support surfaces but additionally by engagement of its shaft end on the side of the shaft toward the bearing nip on a support face which in turn is also provided with a wear-protected surface layer that reduces the coefficient of friction.

The last two support surfaces mentioned are advantageously formed by a sleeve retained in a receptacle. This sleeve can likewise entirely comprise the anti-friction wear-protected material. An economical material having these properties is for example a carbon fiber or graphite material.

The indicated ratio between the center axis offset and the difference in diameter between the pole disks and the annuli defines the offset of the center axis that is advantageous according to the invention. Relative to the bearing arrangement of the invention, corresponding absolute values thus advantageously result.

The dimensioning of the magnetic rings and pole disks is preferably optimized for the corresponding dimensions of one another and the bearing rigidity. For example, the offset of the center axis of the rotor from the center axis of the static bearing component is from about 0.2 to about 1.0 mm, and preferably from about 0.25 to about 0.4 mm. The requisite bearing rigidity also exists even though on the side of the static bearing component remote from the bearing nip, the bearing offset causes markedly larger air gaps exist between the annuli and the pole rings, which weaken the magnetic field. In principle, the relationships should be selected such that, for an increased cross sectional area of the magnets, correspondingly increased cross-sectional areas of the pole disks are selected, in order to prevent magnetic saturation of the pole disks that limits the magnetic flux attainable by the magnets.

To attain the requisite magnetic flux for the functionally required bearing rigidity, in conjunction with the existing installation space, it is advantageous to select rare earth as the magnetic material.

It is advantageous for a pole disk that is located between magnetic rings to have approximately twice the thickness of the outer pole disks, because this pole disk conducts the magnetic flux from both adjacent magnets. Otherwise, saturation, with the aforementioned consequences, would be expected in the region of this middle pole disk as well.

The bearing rigidity can also be optimized if the annuli and pole disks have the same width. It is also advantageous for the development of the magnetic field if the opposed edges of the pole disks and the annuli are nonrounded.

The grooves between the annuli of the rotor shaft are preferably filled with a nonmagnetic material, which may advantageously be copper or copper compounds which have better heat resistance than plastic. However, still other known nonmagnetic metal materials can also be used, such as tin, zinc or aluminum.

To achieve the requisite bearing rigidity even when little space is available, rare earth magnets are highly advantageous.

Nonrounded edges of pole disks and the annuli improve the magnetic flux density and thus enhance the contribution to increasing the magnetic rigidity.

As one alternative embodiment, the rotor shaft has a constant diameter over its entire length, that is, including the region of the axial bearing, which leads to advantages in terms of production costs. As a second alternative, a graduation of the rotor shaft diameter in the region of the axial bearing can be considered; at high rotor speeds, in particular above 150,000 rpm, this improves the concentricity of the rotor because of the significant increase in the natural frequency via the operating rpm. The absolute depth of the grooves used for machining out the annuli decreases accordingly, to assure the stability of the rotor shaft in the region of the axial bearing.

By means of dimensioning the permanent-magnetic rings according to the invention in conjunction with the pole disks and the annuli width, the axial bearing rigidity required for secure, reliable, safe function can nevertheless be maintained.

Further details of the invention will be understood from exemplary embodiments described below in conjunction with the drawings.

BRIEF DESCRIPTION OF THE DRAWINGS

FIG. 5 is a vertical cross-section through a permanent-magnetic axial bearing which is a variant of the axial bearing shown in FIGS. 2 and 3.

DESCRIPTION OF THE PREFERRED EMBODIMENT

Figure 1:
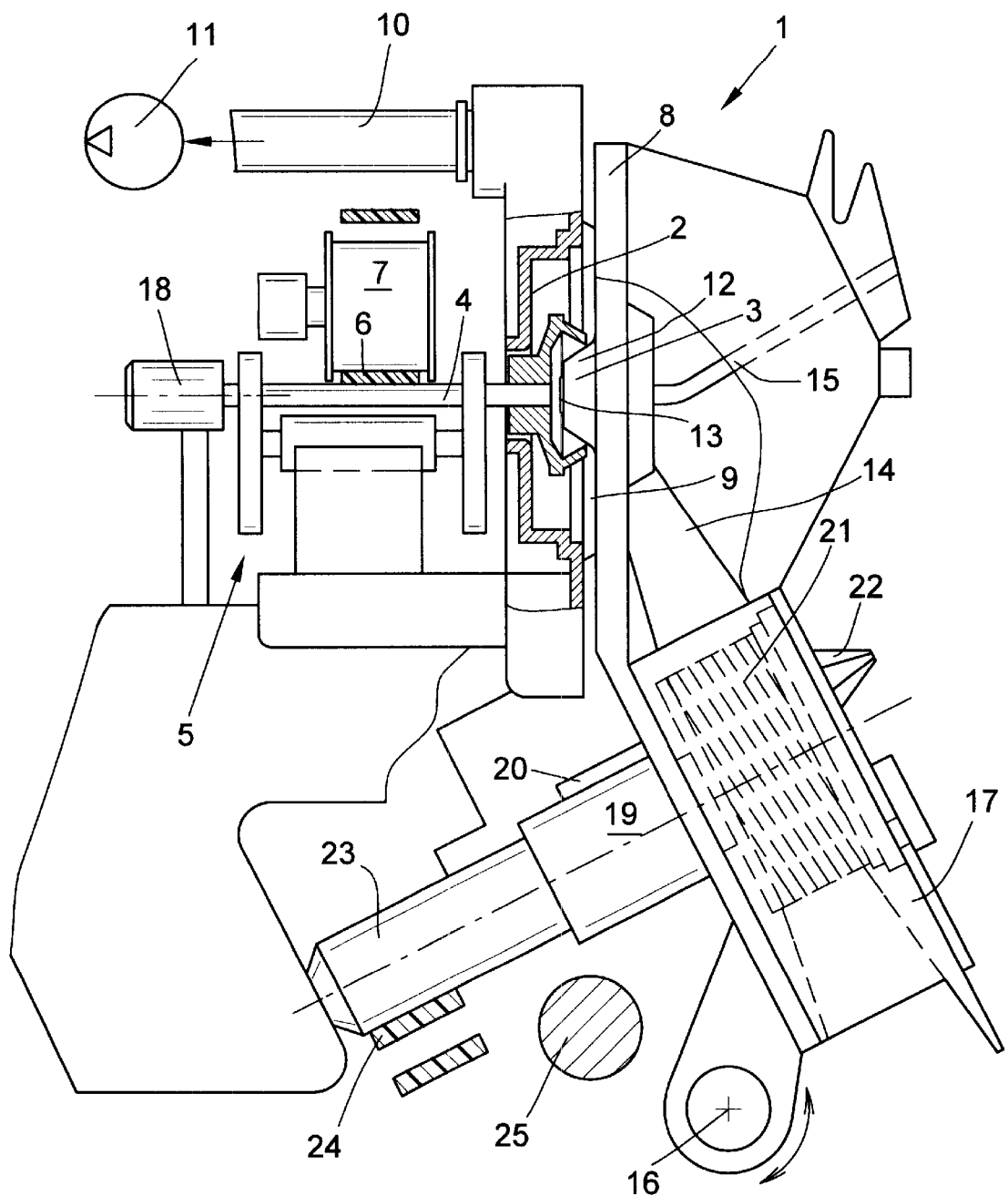
FIG. 1 shows an open-end spinning apparatus with a spinning rotor that is supported by its rotor shaft in the bearing nip of a support disk bearing and is positioned via a permanent-magnetic axial bearing on the end of the rotor shaft, in accordance with the present invention.

An open-ended spinning assembly of the type to which the present invention relates is shown in FIG. 1 and is identified overall by reference numeral 1. In a known manner, the spinning assembly has rotor housing 2, in which a spinning cup of a spinning rotor 3 revolves at high speed. The spinning rotor 3 is supported radially by its rotor shaft 4 in the bearing nip of a support disk bearing 5 and is braced radially in such disposition by a tangential belt 6 which extends the same length as the machine, the belt being positioned by a contact-pressure roller 7. The fixation of the rotor shaft 4 axially with respect to support disk bearing 5 is effected via a permanent-magnetic axial bearing 18, which is shown in detail in FIGS. 2 and 3.

In the usual manner, the rotor housing 2 is open toward the front and is closed during operation by a pivotably supported cover element 8, into which a channel plate (not identified by reference numeral) is placed along with a seal 9.

The rotor housing 2 is also connected via a suitable suction line 10 to a negative pressure source 11, which generates the negative spinning pressure required in the rotor housing 2.

A channel plate adapter 12 is disposed in the cover element 8, and a yarn draw-off nozzle 13 along with an orifice region of a fiber guide channel 14 are fitted to the channel plate adapter 12. The yarn draw-off nozzle 13 is adjoined by a yarn draw-off tubule 15. The cover element 8 is supported about a pivot shaft 16 in a manner permitting a limited degree of rotatability, and an opening roller housing 17 is fixed to this cover element. The cover element 8 also has bearing brackets 19, 20 on its back side for supporting an opening roller 21 and a sliver delivery cylinder 22, respectively. The opening roller 21 is driven in the region of its wharve 23 tangentially by a traveling endless belt 24 which extends the full length as the machine, while the drive (not shown) of the sliver insertion cylinder 22 is preferably effected via a worm gear arrangement that is connected to a drive shaft 25 which similarly extends the full length as the machine.

Figure 2:
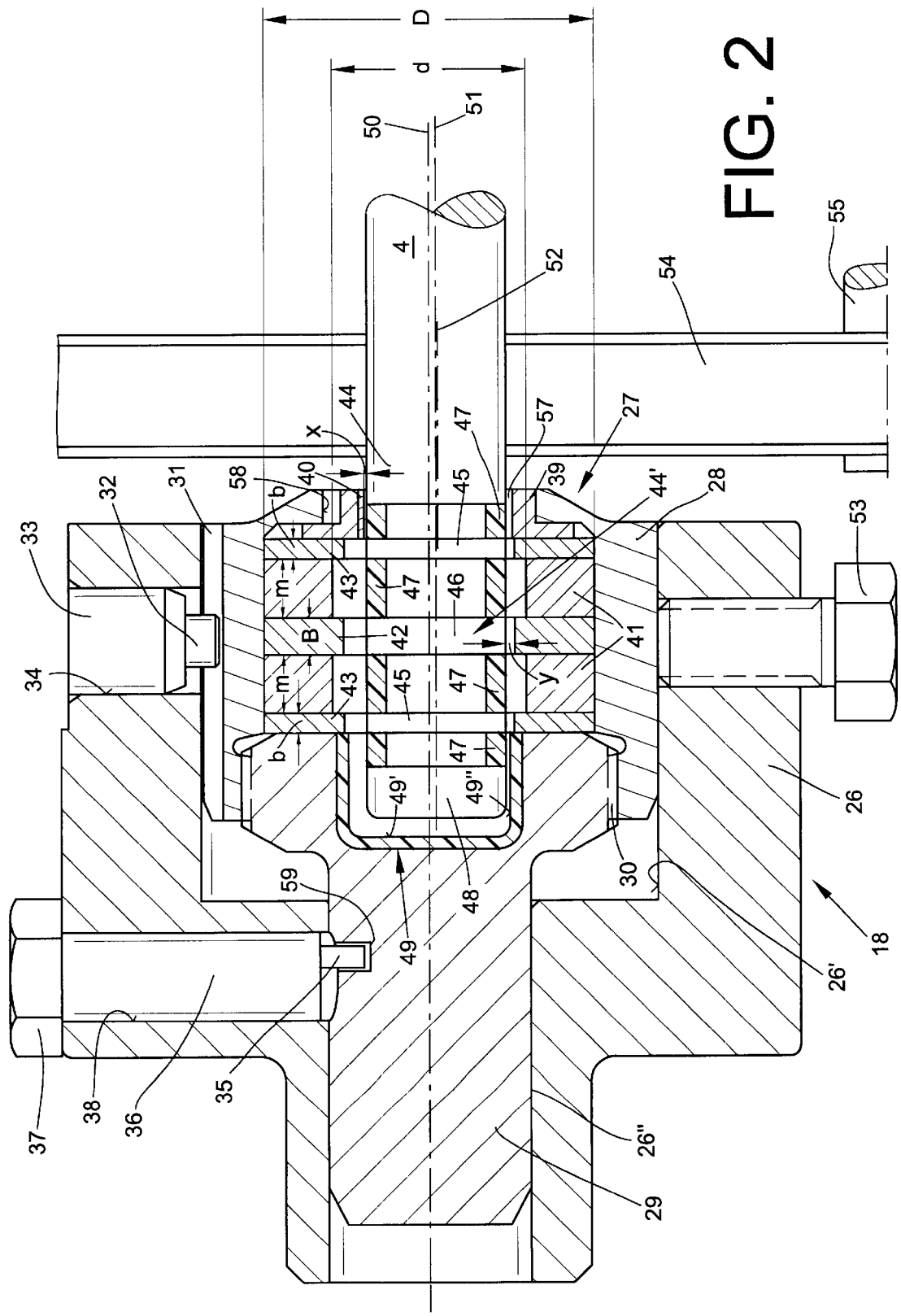
FIG. 2 is a vertical cross-section through the permanent-magnetic axial bearing of the spinning apparatus of FIG. 1.

FIG. 2 shows the axial bearing of the present invention in detail, with the components of the axial bearing 18 in vertical cross-section. The radial support disk bearing 5 comprises two spaced pairs of support disks 54, 54' which collectively define a bearing nip therebetween, one support disk 54 on a shaft 55 being shown in part in FIG. 2, while in FIG. 3 portions of the rearward pair of the support disks 54 and 54' are shown in order to depict the location of the bearing nip 56 of the rear support disks. A corresponding pair of support disks is spaced apart forwardly of such rearward support disk pair in the vicinity of the spinning cup of the spinning rotor 3, as can be seen from FIG. 1.

The magnetic axial bearing 18 comprises a static bearing component 27, which is retained in a bearing housing 26 in a manner permitting axial adjustability. Active bearing components, in the form of permanent-magnetic rings 41 spaced apart by rings 42 and 43 disposed on both sides of permanent-magnetic rings 41 to serve as pole disks, are disposed inside a bearing bush 28. A receptacle 29 is engaged via mating screw threads 30 to the bearing bush 28 on its rearward end. The receptacle 29 presses the active bearing components 41, 45, 46 supported inside the bearing bush 28 forwardly against a ring insert 39 disposed within a bore 58 at the front end of the bearing bush 28. This arrangement of components creates a stable bearing construction on the one hand, and on the other hand allows unproblematic dismantling of the bearing, e.g., for replacing individual parts located inside the bearing.

The bearing bush 28 is axially displaceable within a bore 26' of the bearing housing 26, and the receptacle 29 is axially displaceable in a smaller bore 26", offset from the bore 26', of the bearing housing 26. As a result, the stationary bearing component 26 can be exactly adjusted axially, to obtain the optimal position of the rotor cup from the standpoint of spinning technology.

To prevent twisting of the bearing bush 28 inside the bearing housing 26, a pin 32 of a bolt 33 disposed in a bore 34 engages a longitudinal groove 31 in the bearing bush 28. Another bolt 36 extends through a bore 38 in the bearing housing 26 into proximity to the receptacle 29 and has a pin 35 projecting eccentrically therefrom into engagement in a groove 59 of the receptacle 29 to permit simple axial adjustment of the static bearing component 27 within the bearing housing 26. The bolt 36 has a hexagonal head 37 for easy engagement via and adjusting rotation by a common tool. A locking screw 53 braces the bearing housing 26 against the bearing bush 28 to fix the axial position of the static bearing component 27.

The rotor shaft 4 extends outwardly through an opening in the rotor housing 2 and rests within the bearing nip of the support disk bearing 5, in which disposition the rotor shaft 4 is introduced through a central bore 57 of the forward ring insert 39. The rearward end portion 44' of the rotor shaft 4 thereby serves as a dynamic axial bearing component within the static bearing component 27, while the remaining portion 44 of the shaft 4 remains outside the axial bearing 18 to serve the purpose primarily of radially supporting the spinning rotor 3. Annular grooves 47 are formed in this axial bearing portion 44' of the rotor shaft 4 that are filled with nonmagnetic material, and these grooves 47 thereby form annuli therebetween in the form of ribs 45 and 46 of different widths. The rotor shaft 4 and rotor 3 are made of steel with ferromagnetic properties. Once the rotor shaft 4 has been introduced fully into the axial bearing 18, these ribs 45 and 46 are aligned with the pole disks 42 and 43 disposed on both sides of the permanent-magnetic rings 41. The pole disks 42 and 43 accordingly have the same widths as the ribs 45 and 46. The width B of the middle pole disk 42 and of the middle rib 46 is twice as large as the width b of the outer pole disks 43 and the outer ribs 45. Advantageously, the width b of the pole disks 43 is 1 mm, while the width B of the middle pole disk 46 is two mm. The width m of the permanent-magnetic rings 41 is 3.5 mm each. The ratio of the outer diameter D of the permanent-magnetic rings 41 to the inside diameter d is 1.7: 1.

The permanent-magnetic rings 41 are formed by axially polarized rare earth magnets, in which identical poles (N/N i.e., north, and S/S, i.e., south, respectively) face one another. The nonmagnetic material filling the grooves 47 is a copper alloy, such as brass, which is soldered to the shaft with hard solder. Besides copper alloys, other nonmagnetic substances can also be considered, e.g., aluminum, tin or zinc. These metal substances have the advantage, for example, in comparison to the possibility of using a plastic filling of the grooves 47, of providing high thermal resistance as well as stabilization of the rotor shaft 4 or more specifically its axial bearing portion 44'.

The center axis 51 of the rotor as supported within the bearing nip 56 is lower in relation to the center axis 50 of the static bearing component 47. The radial adjustment of the rotor axis is effected either by adjusting the support disk bearing 5 or by adjusting the axial bearing 18. Advantageously, the entire bearing 5 or 18 is adjusted in a mount, shown in FIG. 1 inside the spinning assembly 1. This eccentric disposition of the rotor shaft 4 with its axial bearing portion 44' inside the static bearing component 27 brings about a reduction in the gap width between the ribs 45 and 46 and the pole disks 42 and 43 on the underside of the shaft facing into the bearing nip 56. In this respect, care must be taken that the spacing still be great enough to prevent the aligned metal bodies from touching one another with resultant damage and heating. A ratio of more than 1:3 between the offset of the center axes 50 and 51 and the difference in diameter between the inside diameter of the pole disks 42 and 43 and the outside diameter of the ribs 45 and 46 should therefore be avoided. Otherwise, the eccentricity and thus its intended effect become too low.

Figure 3:
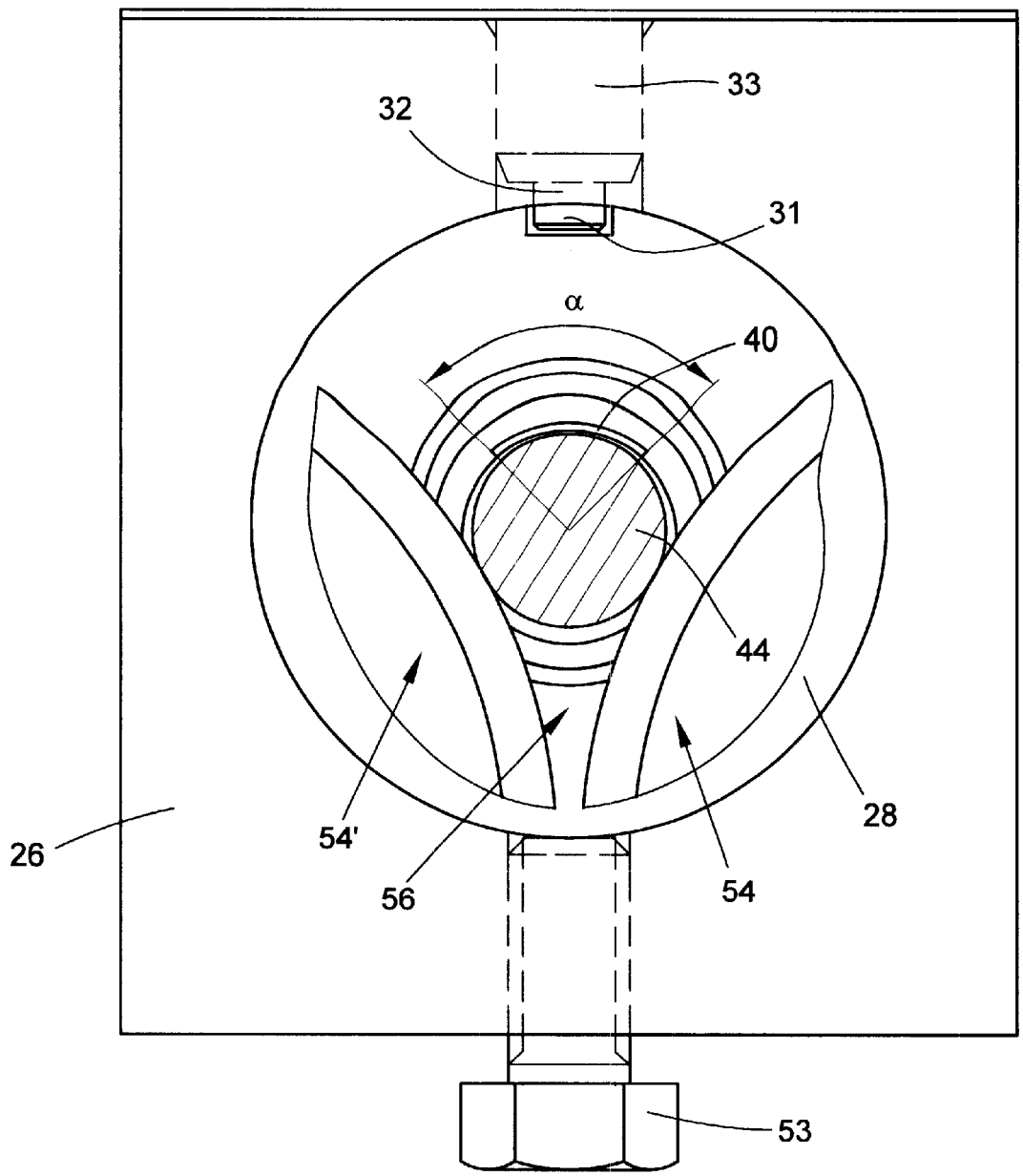
FIG. 3 is a front elevational view of the bearing shown in FIG. 2.

As can be seen from the drawings of FIGS. 2 and 3, the bearing gap between the bore 57 and the ring insert 39 is larger on the side toward the bearing nip 56, or in other words is approximately twice as large as the annular gap on the opposite side. This is attained by displacing the ring insert 39 somewhat farther relative to the static bearing component 27 in the direction of the bearing nip 56 than the rotor shaft 4 itself. This also provides increased safety and reliability because ribs 45, 46 and pole disks 42, 43 do not touch one another, and the rotor shaft can have a constant diameter over its entire length, which is thus not reduced in the axial bearing portion 44'. Accordingly, only the grooves 47 for forming the ribs 45, 46 are necessary. This constant rotor shaft diameter has advantages principally in terms of production, compared with rotors with additional graduations.

Graduating the diameter of the rotor shaft (as depicted by rotor shaft 4' in the alternative embodiment of FIG. 5), however, has the advantage that, in the region of the axial bearing 18 the rotor shaft has an increased natural frequency which, as a function of the other rotor dimensions and the high operating rpm of the spinning rotor 3, has a favorable effect on the concentricity and thus in particular on the noise emitted.

If it is assumed that the portion of the rotor shaft 4' disposed in the bearing nip 56 has a diameter R, specified for example for reasons of vibration in the radial bearing region, then graduating the rotor shaft 4 to reduce its axial bearing portion 44' to a lesser diameter r leads to a limitation of the possible depth of the grooves 47', in order not to threaten the requisite stability of the rotor shaft in this region. The absolute depth of the grooves 47' is reduced, while maintaining the rib diameter reduced by a factor of 0.1 to 0.3 relative to the grooves 47; the factor of 0.1 is best for the sake of stability of the rotor shaft, but is the less-favorable variant in view of attaining maximum bearing rigidity. Still, both values in the range indicated are within an acceptable range. A value of 0.15 has proved to be advantageous.

In principle, a radial adjustment of the ring insert 39 inside the bore 58 in the bearing bush 28 is possible, especially to maximize the aforementioned certainty of avoiding contact of the pole disks with the ribs, yet without causing the rotor shaft to run up onto the ring insert 39 during operation.

As a result of the eccentric disposition of the center axes 50 and 51, the rotor shaft 4, or its axial bearing portion 44', is imparted a radial force component directed into the bearing nip 56, which improves the bearing reliability and safety of the rotor shaft 4 in the bearing nip 56.

If the contact-pressure roller 7 is lifted along with the tangential belt 6 from the rotor shaft 4 when interruptions in spinning occur prior to rotor cleaning, the radial force component generated by the axial bearing 18 as described above causes the rotor shaft 4 to pivot slightly counterclockwise. As a result, the rotor shaft 4 initially contacts a surface layer 40 of reduced coefficient of friction which extends over an angular range α of at least about 45° or, as shown in FIG. 3, 90° within the ring insert 39. The narrower annular gap in this region, however, still acts to limit the tilting angle for the rotor shaft 4.

The rotor shaft 4 is also supported by its terminal end 48 on a support surface 49" of a sleeve 49 disposed within the receptacle 29, which sleeve 49 is made entirely of a wear-protected material that reduces the coefficient of friction. A frictional drive, not shown, of the cleaning system of a piecing cart, exerts a substantially axial force on the rotor cup 3, which causes the shaft end 48 to abut a support surface 48' of the sleeve 49. The cooperation of the support surfaces 40, 49' and 49" prevents the rotor shaft 4 from being deflected to a degree that could lead to a contact between the ribs 45, 46 and the pole disks 42, 43 aligned therewith. The material of the support faces, which both reduces the coefficient of friction and at the same time is wear-protected, also counteracts heating of the axial bearing portion 44' of the rotor shaft 4. By example, a carbon fiber or graphite material may be used as the material for the sleeve 49 or the surface layer 40.

Figure 4:
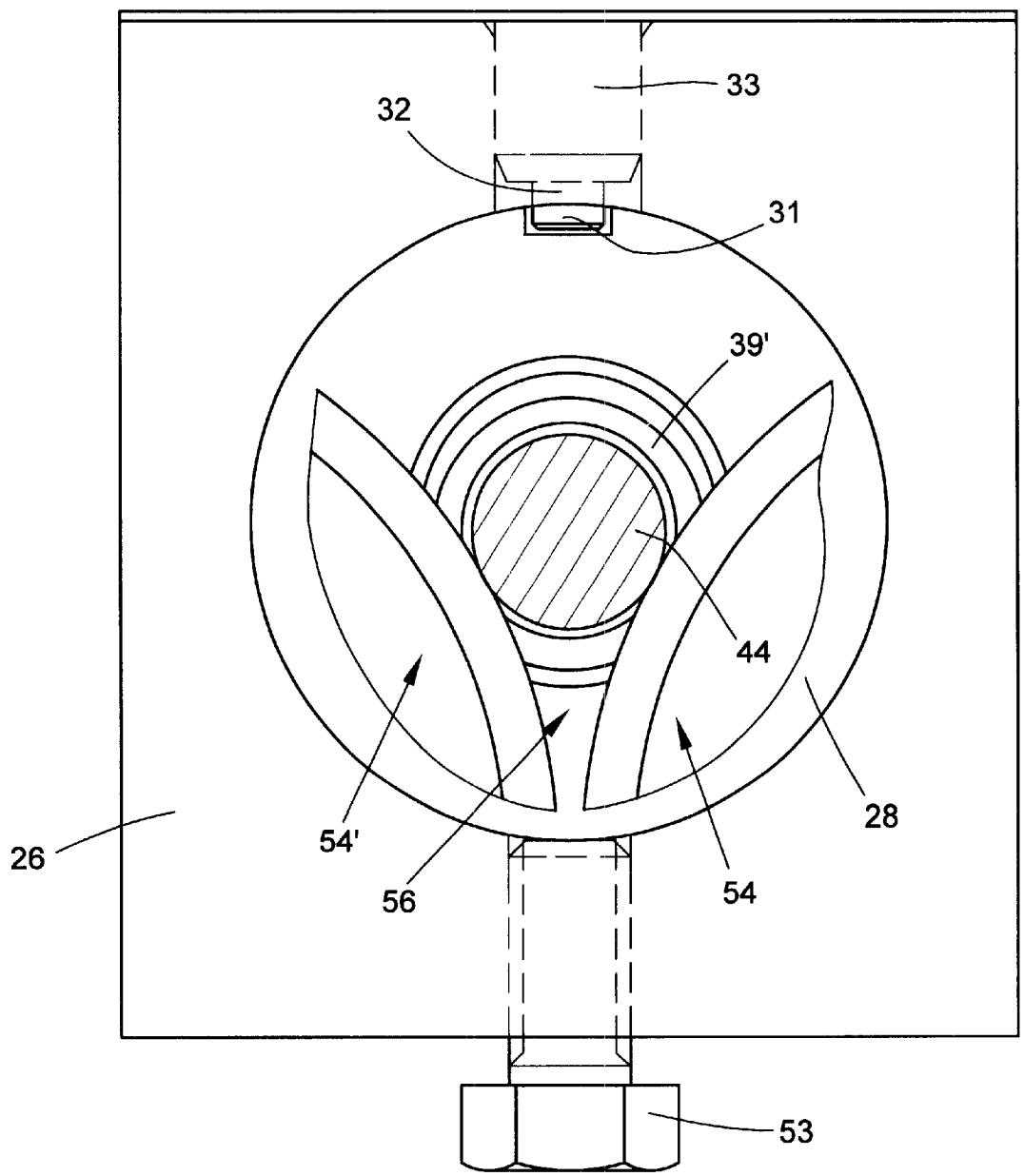
FIG. 4 is a front elevational view of a variant of the bearing shown in FIG. 3.

As an alternative to providing the surface layer 40 extending over an angular range α, it is also possible within the scope of the present invention for the entire ring insert 39 to be made from the anti-friction material of the surface layer (FIG. 4). Likewise, as an alternative to making the bush 49 entirely of an anti-friction material, it is possible to provide an anti-friction layer over only the support surface 49' and a portion of the support surface 49" extending over the same angular range α as the ring insert 39, which layer would be axially spaced apart from the surface layer 40 and disposed radially opposite therefrom, i.e., rotated 180° from it.

In FIG. 4, another alternative can be seen in which the annular gap between the rotor shaft 4 and the ring insert 39' is constant. This reduces the risk of contact between the rotor shaft 4 and the ring insert 39' during operation of the spinning system. However, it should be understood that the adjustment and embodiment of the ring insert need not be in the relationship shown in FIGS. 3 and 4.

To reduce wear, spinning rotors are provided with a coating that is protected against wear, such as a nickel-diamond coating. Covering the rotor shaft 4 in the coating bath also makes it possible to equip it without such a coating on its axial bearing part 44. This reduces the stress on the support faces 40, 49' and 49", thus lengthening their useful life.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A bearing for shaft of a spinning rotor of an open-end spinning apparatus, the bearing comprising a support disk bearing defining a bearing nip for radially supporting the rotor shaft and a magnetic axial bearing for axially positioning the rotor shaft, the axial bearing having a static bearing component with at least two axially polarized permanent-magnetic rings bounded on opposite sides by pole disks, the permanent-magnetic rings being disposed in a bearing body such that corresponding magnetic poles face one another, and the rotor shaft having at least three ferromagnetic annuli at respective spacings from the pole disks, wherein the support disk bearing is disposed in relation to the static bearing component of the axial bearing to retain the rotor shaft in the bearing nip with a center axis of the rotor at an offset in the direction of the bearing nip from a center axis of the static bearing component, and wherein the static bearing component includes an engagement surface outwardly of the magnetic rings and the pole disks toward the support disk bearing and on the side of the support disk bearing remote from the bearing nip, the engagement surface facing the rotor shaft over an angular extent of at least about 45° of the rotor shaft and having a wear protected anti-friction surface layer, and the wear-protected surface layer being spaced a distance, x, from the rotor shaft during operation, with said distance being no more than half the smallest spacing, y, between the pole disks and the ferromagnetic annuli.

2. The bearing of claim 1, wherein the static bearing component of the magnetic axial bearing comprises a bearing bush and an interchangeable ring inserted thereinto, the engagement surface being disposed on the interchangeable ring for permitting the rotor shaft to pass therethrough into the axial bearing.

3. The bearing of claim 2, wherein the interchangeable ring comprises a wear-protected anti-friction material.

4. The bearing of claim 2, wherein the interchangeable ring is radially adjustable selectively to define an annular gap between the interchangeable ring and the rotor shaft uniformly about the rotor shaft or narrower at a side of the rotor shaft remote from the bearing nip.

5. The bearing of claim 2, wherein the magnetic axial bearing comprises another support surface with a wear-protected anti-friction surface layer axially spaced apart from an end of the rotor shaft.

6. The bearing of claim 2, wherein the magnetic axial bearing comprises another support surface with a wear-protected anti-friction surface layer spaced radially from an end region of the rotor shaft located axially outwardly from the permanent-magnetic rings and the pole disks at a side of the rotor shaft facing toward the bearing nip.

7. The bearing of claim 5 or 6, wherein the magnetic axial bearing comprises a receptacles and a sleeve fitted thereto, the sleeve comprising the support surface.

8. The bearing of claim 7, wherein the sleeve comprises a wear-protected anti-friction material.

9. The bearing of claim 1, 5, 6, or 8, wherein the wear-protected anti-friction surface layer comprises a carbon fiber or graphite material.

10. The bearing of one of claim 1, wherein a ratio of the offset between the center axis of the rotor and the center axis of the static bearing component to the difference between an inside diameter of the pole disks and an outside diameter of the annuli is from about 1.0:3.0 to about 1.0:8.0.

11. The bearing of one of claim 10, wherein a ratio of the offset between the center axis of the rotor and the center axis of the static bearing component to the difference between an inside diameter of the pole disks and an outside diameter of the annuli is from about 1.0:4.0 to about 1.0:6.5.

12. The bearing of claim 11, wherein the offset of the center axis of the rotor from the center axis of the static bearing component is from about 0.2 to about 1.0 mm.

13. The bearing of claim 12, wherein the offset of the center axis of the rotor from the center axis of the static bearing component is from about 0.25 to about 0.4 mm.

14. The bearing claim 1, wherein a portion of the spinning rotor located outside the axial bearing comprises a wear-reducing coating.

15. The bearing of claim 1, wherein a ratio of an outside diameter to an inside diameter of the permanent-magnetic rings is from about 1.5:1.0 to about 2.8:1.0, a ratio of the width of the permanent-magnetic rings to a width of the pole disks outwardly of the permanent-magnetic rings is from about 2.5:1.0 to about 5.0:1.0, and a ratio of the width of the permanent-magnetic rings to a width of the pole disk between the permanent-magnetic rings is from about 1.3:1.0 to about 2.5:1.0.

16. The bearing of claim 15, wherein a ratio of an outside diameter to an inside diameter of the permanent-magnetic rings is from about 1.7:1.0 to about 1.8:1.0, a ratio of the width of the permanent-magnetic rings to a width of the pole disks outwardly of the permanent-magnetic rings is from about 3.0:1.0 to about 3.9:1.0, and a ratio of the width of the permanent-magnetic rings to a width of the pole disk between the permanent-magnetic rings is from about 1.5:1.0 to about 2.0:1.0.

17. The bearing of claims 15 or 16, wherein the permanent-magnetic rings comprise rare earth magnets.

18. The bearing of claim 15 or 16, wherein the pole disks and the annuli comprise opposing nonrounded edges.

19. The bearing of claim 15 or 16, wherein the rotor shaft has a diameter that is essentially constant over its entire length.

20. The bearing of claim 15 or 16, wherein a bearing portion of the rotor shaft disposed within the axial bearing is reduced in diameter by ⅛ to about ½ compared with the diameter of the rotor shaft located outside the axial bearing, optionally ¼ to ⅜, and the rotor shaft comprises grooves between the ferromagnetic annuli which are of a further reduced diameter and the pole disks of the static bearing are dimensioned for maintaining a predetermined gap between pole disks and the annuli.

21. The bearing of claim 20, wherein a bearing portion of the rotor shaft disposed within the axial bearing is reduced in diameter by about ¼ to about ⅜ compared with the diameter of the rotor shaft located outside the axial bearing.

22. The bearing of claim 20, wherein the grooves have a depth from about 0.1 to about 0.3 times the diameter of the annuli.

23. The bearing of claim 15, wherein the width of the outward pole disks is from about 0.5 to about 1.5 mm, and the width of the pole disk located between the permanent-magnetic rings is from about 1.0 to about 3.0 mm.

24. The bearing of claim 15, wherein the widths of the pole disks correspond to the widths of the ferromagnetic annuli and the rotor shaft comprises grooves between the ferromagnetic annuli that are filled with a nonmagnetic material.

25. The bearing of claim 24, wherein the nonmagnetic material is copper or a copper alloy.

* * * * *